United States Patent [19]

Ono et al.

[11] Patent Number: 4,855,857
[45] Date of Patent: Aug. 8, 1989

[54] MAGNETIC DISC CARTRIDGE WITH SPINDLE ABUTMENT PLATE

[75] Inventors: Tsuyoshi Ono; Kunihira Seto, both of Kanagawa, Japan

[73] Assignee: Fuji Photo Co., Ltd., Kanagawa, Japan

[21] Appl. No.: 279,275

[22] Filed: Dec. 2, 1988

Related U.S. Application Data

[63] Continuation of Ser. No. 920,498, Oct. 2, 1986, abandoned.

[30] Foreign Application Priority Data

Oct. 19, 1985 [JP] Japan .................. 60-159264[U]

[51] Int. Cl.⁴ .................................................. G11B 23/02
[52] U.S. Cl. ..................................... 360/133; 360/97.01
[58] Field of Search .................. 360/97.01, 99.12, 132, 360/133, 135

[56] References Cited

U.S. PATENT DOCUMENTS

| | | | |
|---|---|---|---|
| 4,149,207 | 4/1979 | Porter et al. | 360/133 |
| 4,529,645 | 7/1985 | Berg et al. | 428/343 X |
| 4,544,977 | 10/1985 | Ozawa et al. | 360/133 |
| 4,609,964 | 9/1986 | Sobel | 360/135 |
| 4,647,506 | 3/1987 | Colon et al. | 360/135 X |
| 4,672,488 | 6/1987 | Wright | 360/135 X |

Primary Examiner—John H. Wolff
Attorney, Agent, or Firm—Sughrue, Mion, Zinn, Macpeak & Seas

[57] ABSTRACT

A drive spindle abutment plate 14 centrally mounted on the inner wall of a protective envelope enclosing a floppy disc is formed by a surface layer 15 of macromolecular polyethylene or the like and an interposed base layer 16 of relatively hard material such as polyethylene terephthalate. Indentation by the end of the spindle during use is thus minimized to preserve the necessary gap between the envelope and the disc core 6, thereby preventing the core from scratching against the envelope and disturbing the disc rotation.

2 Claims, 1 Drawing Sheet

MAGNETIC DISC CARTRIDGE WITH SPINDLE ABUTMENT PLATE

This is a continuation of application Ser. No. 06/920,498, filed Oct. 2, 1986, which is now abandoned.

BACKGROUND OF THE INVENTION

This invention relates to a magnetic disc cartridge in which an extremely thin disc-shaped magnetic recording sheet is rotatably supported, and more particularly to such a cartridge in which the part adapted to contact the end of the spindle of the sheet rotating means is improved.

To read or write magnetic data on such a disc sheet, a read/write head is radially moved across the sheet while it is being rotated. If the sheet is irregularly rotated, however, the signal inputting or outputting operations are adversely affected. More specifically, a 3.5" magnetic disc cartridge has a central core through which the cartridge is coupled to a sheet rotating means. If the protective case or envelope enclosing the sheet is deformed, the central core may scratch the inner wall of the case. As a result, the sheet may not be rotated smoothly, and data loss may occur.

To eliminate these difficulties, a conventional magnetic disc cartridge has incorporated an abutment plate at the center of the inner wall of the case, adapted to contact the end of the spindle of the sheet rotating means. When the case wall confronting the sheet is curved or distorted inwardly towards the sheet, the end of the spindle abuts against the plate to prevent the scratching of the case wall by the central core.

The abutment plate is made up of an outer surface layer, and an intermediate base layer through which the surface layer is bonded to the inner wall of the case. The surface layer is made of material such as macromolecular polyethylene so that it is sufficiently durable (wear resistant) when contacted by the rotating end of the spindle. It is difficult to machine this surface layer. The base layer is made of relatively soft unwoven cloth of rayon or the like into which adhesive is impregnated. With such a construction the abutment plate is gradually but significantly indented by the end of the spindle, however, and the service life of the cartridge is thus relatively short.

SUMMARY OF THE INVENTION

Accordingly, an object of this invention is to eliminate the above-described difficulties accompanying a conventional magnetic disc cartridge by providing a magnetic disc cartridge having an improved abutment plate construction which is serviceable over a prolonged period of use. More specifically, the interposed base layer of the abutment plate is made of a relatively hard material such as polyethylene terephthalate, and adhesive is applied to both of its surfaces during the assembly and installation of the plate.

DETAILED DESCRIPTION OF THE PREFERRED EMBODIMENT

Figure 1:
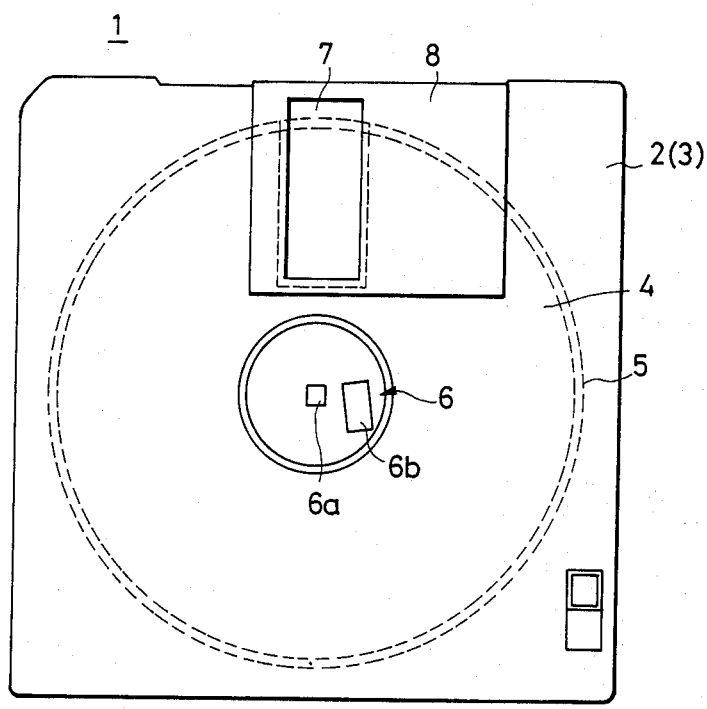
FIG. 1 is a plan view of a magnetic disc cartridge according to the present invention.
Figure 2:
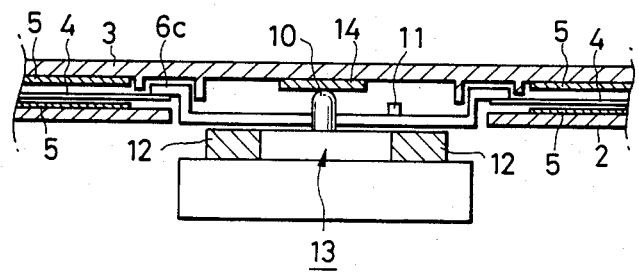
FIG. 2 is a sectional view of essential components of the cartridge, showing a magnetic disc sheet driven within a surrounding case.

Similar to a conventional magnetic disc cartridge, the cartridge of this invention comprises an outer case or envelope formed by joined upper and lower halves 2, 3 made of relatively hard plastic resin. The case accommodates a magnetic disc sheet 4 and inner liners 5 made of unwoven cloth to protect and clean the sheet. A core member 6 is provided at the center of the sheet, and is held by the rotating magnetic chuck 13 of a signal recording and reproducing device, as shown in FIG. 2. The case has a rectangular opening 7 confronting the magnetic head of the recording and reproducing device, and a dust-proof shutter 8 for closing the opening. Lifters (not shown) are provided between the inner walls of the case and the liners 5 so that the latter are suitably brought into contact with the magnetic disc sheet 4.

As shown in FIG. 2, the center core 6 is dish or cup shaped in section, and has an outer peripheral flange 6c to which the disc sheet 4 is bonded. The central part of the core is held by an annular magnet 12 of the chuck 13. A hole 6a in the core center is engaged by the spindle 10 of a sheet rotating means, and an off center hole 6b accommodates the insertion of a drive pin 11.

Figure 3:
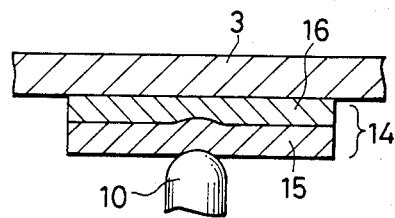
FIG. 3 is an enlarged sectional view of the spindle abutment portion of FIG. 2.

An abutment plate 14 adapted to contact the end of the spindle 10 is bonded to the center of the inner wall of the lower case half 3. The plate 14, as shown in FIG. 3, comprises a surface layer 15 and an intermediate base layer 16. As the surface layer 15 is brought into contact with the spindle 10 in use, it is made of material such as macromolecular polyethylene high in durability. The base layer 16 is made of polyethylene terephthalate or the like which is relatively hard so that it is scarcely deformed by external pressure.

The surface layer 15 of the plate 14 is about 130 um in thickness, and the base layer 16 is about 50 to 70 um in thickness. Adhesive is coated on both surfaces of the base layer to a thickness of about 30 to 40 um to bond the base layer to the surface layer 15 and the lower half 3. When the cartridge is used the end of the spindle 10 abuts against the plate 14 and indents it as shown in FIG. 3. The deformation of the plate is minimized, however, by the presence of the relatively hard base layer 16. This eliminates the difficulties arising from the reduction of the gap between the upper and lower case halves due to the excessive deformation of the abutment plate with use, and thus prevents the lower half 3 from being scratched by the flange 6c and the attendant increase of the running torque.

Since the base layer 16 is made of a material which is harder than the unwoven cloth of the prior art, the abutment plate 14 is only slightly indented when contacted by the spindle 10. The gap between the upper and lower case halves is thus maintained substantially unchanged, which prevents the center core flange 6c from scratching the lower case half and forming resin shavings, and prolongs the useful life of the cartridge.

What is claimed is:

1. A magnetic disc cartridge including an abutment plate (14) adapted to contact the end of a spindle (10) of magnetic disc sheet rotating means, said plate being disposed at the center of a wall (3) of a protective envelope in which a magnetic disc sheet (4) is rotatably accommodated, characterized in that:

said abutment plate comprises a surface layer (15) for engaging the spindle end and a base layer (16) made of a material harder than said surface layer and interposed between said wall and said surface layer, said surface layer being bonded to said wall of said envelope by adhesive applied to both surfaces of said base layer, wherein said base layer has a sufficiently high compressive strength to resist indentation thereof by said spindle end.

2. A magnetic disc cartridge according to claim 1, wherein said base layer is made of polyethylene terephthalate.

* * * * *